T. J. HOLMES.
LUBRICATOR.
APPLICATION FILED APR. 6, 1918.
1,297,850.
Patented Mar. 18, 1919.
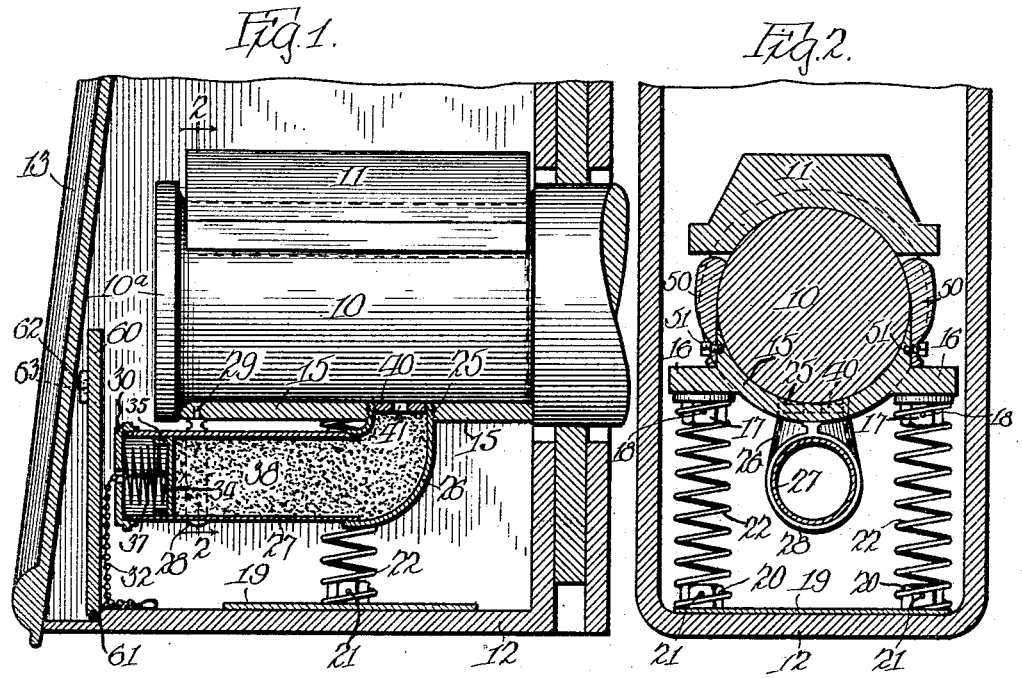
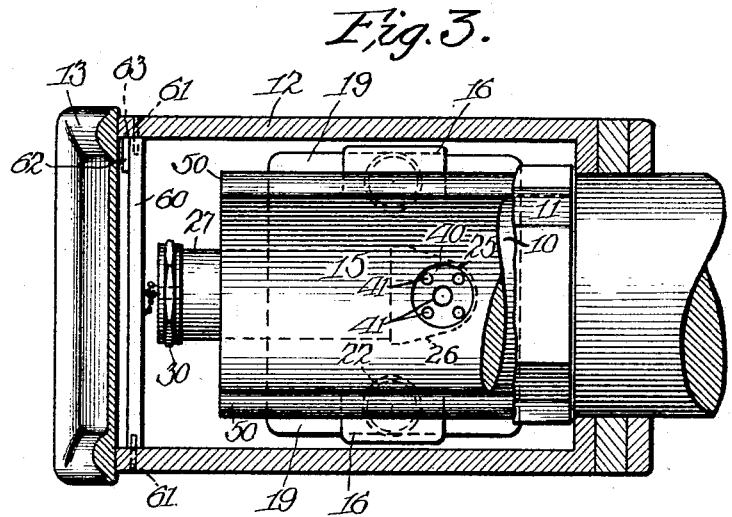
WITNESS
INVENTOR,
Thomas J. Holmes
BY
Luther Johns
ATTORNEY

UNITED STATES PATENT OFFICE.

THOMAS J. HOLMES, OF CHICAGO, ILLINOIS.

LUBRICATOR.

1,297,850. Specification of Letters Patent. Patented Mar. 18, 1919.

Application filed April 6, 1918. Serial No. 227,006.

*To all whom it may concern:*

Be it known that I, THOMAS J. HOLMES, a citizen of the United States, and a resident of Chicago, in the county of Cook and State of Illinois, have invented certain new and useful Improvements in Lubricators, of which the following is a specification.

My invention relates to devices for lubricating journals. In my U. S. Letters Patent No. 1,230,299 of June 19, 1917, and 1,253,036 of January 8, 1918, I have shown somewhat similar devices and in the accompanying drawings, which form a part of this specification, and which illustrate the present improvements, I have shown another form of the device of my invention, and one which is in the nature of an improvement over the specific structures of my patents mentioned, whereby the number of parts is reduced, the construction simplified, and the advantages of great mileage on a single charging, as well as simplicity and ease of charging the device are obtained; and also in providing a protecting device for the journal and telltale means for indicating excessive heat, should the journal for any reason, of an accidental nature, become unduly hot. Another feature of advantage is in the provision of an auxiliary inner wall for the journal casing whereby the journal may be lubricated according to the old method of employing waste and oil, should it be desired for any reason, such as the failure of a supply of grease in candle or other suitable form at any particular station, to pack the journal with waste in the old way, first removing the specific form of lubricator. Still another feature of advantage is in providing locking means by which a lubricator of the removable type, for instance such as are shown by my said patents and in this application, may not be tampered with by unauthorized persons. Other objects and advantages will appear hereinafter.

In these drawings, Figure 1 is a fragmentary medial vertical longitudinal sectional view of a car journal box, journal, etc., with these improvements therewith, some of the parts being shown in full lines;

Fig. 2 is a sectional view of the parts of Fig. 1, as on the line 2—2 thereof viewed in the direction of the arrows; and Fig. 3 is a fragmentary top view of the parts of Fig. 1 and Fig. 2, the journal and journal block being partly broken away.

The journal 10 and journal block 11 are shown in the usual form. The journal box or casing 12 is modified somewhat from the usual construction in that it provides greater space below the journal, and the bottom wall is substantially horizontal from front to rear so that the unitary lubricating device may readily be inserted and withdrawn. A door 13 (to be understood as being hinged at the top) covers the front end of the journal box 12.

The friction piece 15 is of metal, suitably cast brass or bronze, or it may be stamped from sheet metal of substantial thickness. It has extending ears 16 approximately midway of the ends, to the undersides of which are secured projections 17, shown as nuts which are riveted to the ears 16. A pin 18 in each projection 17 having outwardly extending ends holds the coiled spring 22 on each side of the device permanently to the friction piece. Upon the plate-like base 19 similar projections 20 are riveted and similar pins 21 hold the springs thereon. In this manner I avoid the use of vertical rods as shown in my prior patents mentioned, and the friction piece, springs and base, and the parts carried by the friction piece from a unitary structure which may be removed from the journal box by pressing downward upon the ears 16 until the friction piece comes below the flange 10$^a$ of the journal, and then drawing the same forward.

The friction piece 15 has a bearing surface which conforms to the surface of the journal, as in my former patents mentioned, and it is provided with an opening at 25, which I have shown as located rearward of the middle of the friction piece, thus providing for a longer reservoir and also providing a more balanced construction. This opening 25 is encompassed or surrounded by the surface of the friction piece adapted to contact the journal. Into this opening 25 I secure, as by threading, the elbow 26 and into the elbow I secure, as by threading, the tube 27, the elbow and tube constituting a reservoir for grease. The outer or free end portion of the reservoir is supported by the encompassing ring 28 held upon the friction piece 15 by a projecting pin-like portion 29 having the end riveted.

The tubular member 27 is sufficiently spaced from the friction piece 15 to clear the flange 10ª of the journal.

A readily removable closure cap 30 is threaded upon the outer end of the tube 27, the same having a central opening 31 for the chain 32 secured to the piston 34, which piston may be provided with a packing ring 35. The piston is urged toward the elbow by the coiled spring 37, and operates to force the grease 38 to the bearing surface.

Within the inner opening of the elbow 26 I secure, as by threading, the partial closure 40, having a plurality of openings 41 through which the grease may pass. I have found that it is more advantageous in practice to provide a plurality of small openings for this purpose than a single relatively large opening, due to the fact that the parts become warm in service, inducing a fairly free movement of the grease. The partial closure 41 acts to maintain the main bulk of the grease from contacting the journal at that place, while permitting it to issue in relatively small yet sufficient amounts, and at spaced apart regions.

I have discovered that the piston 34 propelled by a spring is not strictly necessary to the successful operation of the device, since the rotating journal continually taking away minute particles of the grease causes a suction action at the openings 41, pulling the rest of the grease continually upward and thus maintaining the lubrication. However, I prefer to employ the spring and piston in practice as a precaution or factor of safety against some such mischance as a failure on the part of an employee properly to charge the reservoir.

It will be noted that the pipe 27 is somewhat larger in diameter than the opening at 25. I find in practice that this pipe 27 or main body of the reservoir may be materially large so as to hold a considerable quantity of lubricant, and that owing partly to the suction effect mentioned, in conjunction with the warmth of the parts developed by the rotating journal, and perhaps partly by the spring actuating the piston, the grease, although of a comparatively hard and stiff character, and in the form of a candle, makes its way through the narrowing walls of the elbow 26 with the desired results. I have found that a surprisingly large mileage can be obtained with this device upon a very notably small amount of lubricant.

In charging the device initially the candle material or other form of grease that may be employed is forced into the reservoir until it is well packed therein, the cap 30 being unscrewed and the piston withdrawn for the purpose. The recharging operation can be performed in the same manner from time to time without removing the device from the box if so desired, it being only necessary to insert a piece of the candle material and replace the piston and other parts.

An important feature of advantage is in the provision of the wing-like dust guards or journal protectors 50. I have shown these as secured by screws 51 to the friction piece 15 in substantially vertical arrangement and substantially the length of the journal, and as substantially filling the space between the friction piece and the bearing block 11. The invention in respect to such wing-like flexible coverings for the journal is not limited to the specific application or construction herein illustrated or described, as they may be otherwise secured in operative position with similar effect. I have demonstrated that their presence on a car journal is of great importance, since the fine gritty particles entering the journal box while the car is running has a large effect, according to hitherto practice, in inducing overheating of the journal and the excessive wear of the parts. These flaps or wings 50 are preferably of a flexible fabric material and are preferably of material thickness. They desirably have the property of absorbing substances including grease which coöperates in maintaining the journal lubricated. Their properties of absorption enable them to hold a considerable quantity of some material such as heavy tar or pitch which, when sufficiently heated, will develop a great deal of smoke. According to common practice the operators of trains depend largely upon the presence of smoke issuing from the boxes to determine when a bearing is becoming dangerously hot. While combustion in such a box is far from being desirable, the development of a considerable amount of smoke due to excessive heat is considered important in the art. These flaps, wings or curtains 50 may be made of a number of plies of cotton fabric, which would contribute the smoke of its own burning to that of the grease and tar with which it is charged. This telltale or warning feature of these improvements is important as a safeguard against accidents due to some mischance or neglect on the part of an employee charged with maintaining the lubricating device in proper condition.

Another feature of importance is in the provision of the interior wall 60 extending from side to side and to the bottom of the casing 12, being preferably movably mounted, as by hinging the same at the bottom with hinge pins 61, a lock 62 having a bolt 63, and operated by keys in the hands of authorized persons, being adapted to maintain the same in the position illustrated. This wall 60 has the function of locking the lubricating device against withdrawal or being tampered with by unauthorized persons. It has the further function of providing a well or pocket substantially beneath the journal which may be filled with waste and oil according to the old practice for lubricating the journal at any time it should be desired to remove the unitary lubricating device shown, as because of a failure at any particular station to have a supply of the proper lubricant for that device on hand. This interior wall 60 opens outward and admits of ready access to the parts beneath the journal when desired, as for removing any special form of lubricator therein, for cleaning or for inspection of parts.

Various changes in construction and arrangement of parts are contemplated by me as being within the scope of the improvements set forth.

I claim:

1. In a lubricating device for a bearing, the combination of a friction piece having a friction surface thereon substantially conforming to the bearing surface of the bearing to be lubricated, means for yieldingly forcing said friction piece normally toward said bearing whereby said friction surface is maintained against the bearing surface of the bearing when the device is normally in use, said friction piece having an opening surrounded by said friction surface, a reservoir for grease carried by said friction piece and extending normally forward longitudinally of the bearing, said reservoir being in communication with said opening, and a spring-pressed piston in said reservoir for forcing grease therein toward said opening.

2. In a lubricating device for a bearing, the combination of a friction piece having a friction surface thereon substantially conforming to the bearing surface of the bearing to be lubricated, means for yieldingly forcing said friction piece normally toward said bearing whereby said friction surface is maintained against the bearing surface of the bearing when the device is normally in use, a pipe-like reservoir normally beneath said friction surface and extending normally forward longitudinally of the bearing, said reservoir turning upward at its inner end and opening into said friction surface, and a readily removable closure for the outer free end of the reservoir.

3. In a lubricating device for a bearing, the combination of a friction piece having a friction surface thereon substantially conforming to the bearing surface of the bearing to be lubricated, means for yieldingly forcing said friction piece normally toward said bearing whereby said friction surface is maintained against the bearing surface of the bearing when the device is normally in use, a pipe-like reservoir normally beneath said friction surface and extending normally forward longitudinally of the bearing, said reservoir turning upward at its inner end and opening into said friction surface, a closure for the free end of the reservoir, and a partial closure for said opening, dividing the area thereof into a plurality of smaller openings.

4. In a lubricating device for a bearing, the combination of a friction piece having a friction surface thereon substantially conforming to the bearing surface of the bearing to be lubricated, means for yieldingly forcing said friction piece normally toward said bearing whereby said friction surface is maintained against the bearing surface of the bearing when the device is normally in use, said friction piece having an opening therethrough, and structure comprising a tubular reservoir terminating in an elbow secured in said opening and extending forward longitudinally of the bearing, with means for supporting the outer free end portion thereof, a readily removable closure cap for the free end portion of the reservoir, and a spring-pressed piston in said reservoir adapted to press grease therein toward said opening.

THOMAS J. HOLMES.

Copies of this patent may be obtained for five cents each, by addressing the "Commissioner of Patents, Washington, D. C."